United States Patent [19]
Lechner

[11] 4,301,334
[45] Nov. 17, 1981

[54] TELECOMMUNICATION SUBSCRIBER LINE ACCESS CIRCUIT WITH GROUND KEY AND INSULATION FAULT INDICATION

[75] Inventor: Robert Lechner, Otterfing, Fed. Rep. of Germany

[73] Assignee: Siemens Aktiengesellschaft, Berlin and Munich, Fed. Rep. of Germany

[21] Appl. No.: 127,569

[22] Filed: Mar. 6, 1980

[30] Foreign Application Priority Data

Mar. 23, 1979 [DE] Fed. Rep. of Germany ....... 2911517

[51] Int. Cl.³ .............................................. H04G 1/36
[52] U.S. Cl. ............................................... 179/16 AA
[58] Field of Search ............ 179/18 F, 18 FA, 27 F, 179/27 FA, 27 G, 16 A, 16 AA, 16 C, 16 D, 16 E, 86, 18 G, 18 EB, 18 HB

[56] References Cited

U.S. PATENT DOCUMENTS 3,121,775  2/1964  Amory et al. .
3,715,511  2/1973  Shaffer ........................ 179/16 AA

FOREIGN PATENT DOCUMENTS 2520975  11/1976  Fed. Rep. of Germany .
2329126  5/1977  France .

Primary Examiner—Thomas A. Robinson
Attorney, Agent, or Firm—Spellman, Joel & Pelton

[57] ABSTRACT

A subscriber line access circuit for use in a telecommunications system is disclosed. The subscriber line access circuit has a power supply bridge in the form of a first resistor inserted in the b-wire (ground potential side) of a subscriber line, a second resistor inserted in the a-wire (supply potential side) of the subscriber line, and a capacitor which bridges the two wires at the terminals of the two resistors on the sides thereof opposite to the respective potential sources. This supply bridge is coupled on the capacitor side with a two-to-four wire hybrid transformer for the two-wire/four-wire transition to the system, and includes an evaluating circuit which delivers an indicating signal when the subscriber actuates a ground key. A cutoff circuit is arranged in the power supply bridge in series with the first or the second resistor, or both, between such resistor and the winding of the hybrid transformer to which it, the resistor, as well as the evaluating circuit are connected. This cutoff circuit comprises a cutoff switch which is opened, with a delay, upon ground key actuation and closed when the ground key actuation is terminated.

3 Claims, 1 Drawing Figure

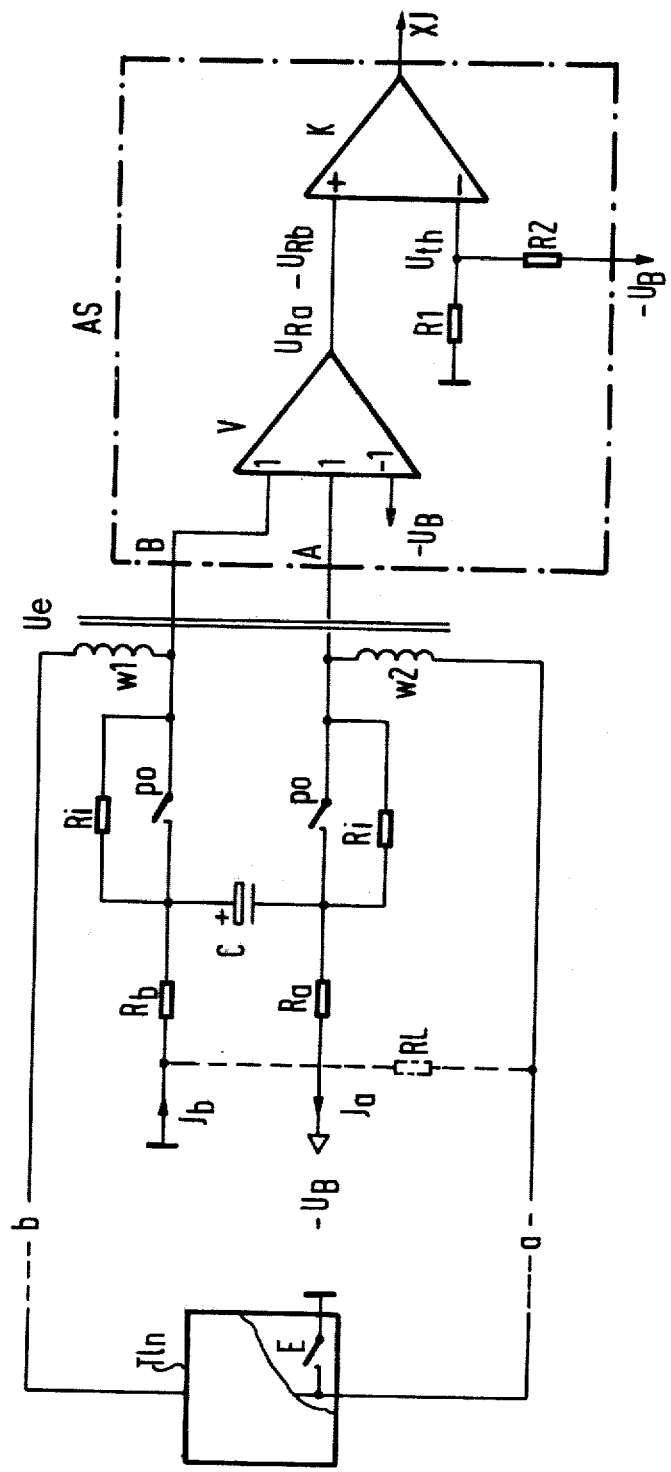

TELECOMMUNICATION SUBSCRIBER LINE ACCESS CIRCUIT WITH GROUND KEY AND INSULATION FAULT INDICATION

BACKGROUND OF THE INVENTION

The present invention relates to a subscriber line access circuit for use in a telecommunications system. The subscriber line access circuit has a power supply bridge in the form of a first resistor inserted in the b-wire (ground potential side) of a subscriber line, a second resistor inserted in the a-wire (supply potential side) of the subscriber line, and a capacitor which bridges the two wires at the terminals of the two resistors on the sides thereof opposite to the respective potential sources. This supply bridge is coupled on the capacitor side with a two-to-four wire hybrid transformer for the two-wire/four-wire transition to the system, and includes an evaluating circuit which delivers an indicating signal when the subscriber actuates a ground key.

Subscriber line access circuits of this kind—that is, those which contain a power supply bridge individual to the subscriber—are provided in exchanges which contain an electronic coupling field. Here, just as in exchanges with space multiplex coupling fields, it is necessary to guard against an overload of the switching elements located in the remaining portion of the power supply circuit when the ground key actuation exceeds a certain length of time. However, with electronic coupling fields this cannot be done by switching off the associated set subassembly in the case of such a ground key actuation. Overdimensioning the power supply bridge, a conceivable solution to the problem of making the bridge less susceptible to overloads, would lead to the result that only few subscriber line access circuits could be combined in one subassembly.

In addition to the desirability of avoiding overloads in the supply circuit, it is of interest also to be able to recognize insulation faults in the access circuit in order to take appropriate measures for disconnection.

It is therefore the object of the present invention to design a subscriber line access circuit in such a way that the above mentioned problems can be solved at minimum expense.

SUMMARY OF THE INVENTION

The object mentioned above, as well as other objects which will become apparent in the discussion that follows, are achieved, according to the present invention, by providing a cutoff circuit arranged in the power supply bridge in series with the first or the second resistor, or both, between such resistor and the winding of the hybrid transformer to which it, the resistor, as well as the evaluating circuit are connected. This cutoff circuit comprises a cutoff switch which is opened, with a delay, upon ground key actuation and closed when the ground key actuation is terminated. The cutoff circuit also comprises a resistor bridging the cutoff switch and having a sufficiently high value that, with the cutoff switch open, the residual current flowing through it due to ground key actuation does not damage the circuit components lying in the affected portion of the supply circuit. This resistor also has a sufficiently low resistance value that the current flowing through it without ground key actuation and due to a leakage current between the wires of the subscriber line in excess of the permitted limit value causes the evaluating circuit to respond, in the same manner as with a closed cutoff switch and simultaneous ground key actuation, to indicate the presence of faulty insulation.

This cutoff circuit, according to the invention, thus operates to insert a high resistance in the power supply circuit when there is a danger of overload. In addition, it permits the evaluating circuit, which is already present for the indication of ground key actuation, to be utilized also for detecting the presence of insulation faults in the subscriber line, thus obviating the need for a special circuit to perform this function. Moreover, the signal paths present in connection with the indication of ground key actuation can also be utilized in the process of insulation testing. In particular, it is possible to indicate the termination of a temporary disturbance so that periodic checking of the subscriber line for this purpose is no longer necessary.

A preferred embodiment of this invention will now be described, by way of example, with reference to the accompanying drawing.

BRIEF DESCRIPTION OF THE DRAWING

The single FIGURE is a schematic diagram of a portion of a subscriber line access circuit, to the extent necessary for understanding the invention.

DESCRIPTION OF THE PREFERRED EMBODIMENT

The illustrated telecommunications subscriber line access circuit comprises a power supply bridge consisting of a resistor Ra, a resistor Rb, and a capacitor C. Resistor Rb lies in the b-wire of the subscriber line, which is connected to ground potential. Resistor Ra lies in the a-wire of the subscriber line, which is connected to the potential $-UB$ of the supply battery. Capacitor C is connected between the b-wire and the a-wire to the terminals of the resistors Rb and Ra on the sides thereof opposite the respective potential sources (ground and $-UB$).

On the capacitor side of the resistors Rb and Ra are provided also the two-wire side windings w1 and w2 of a hybrid transformer Ue for the two-wire/four-wire transmission into the b-wire and a-wire of the subscriber line. The transformer windings forming the four wire side are not shown in the FIGURE. In addition, an evaluating circuit AS is connected at the terminals toward the resistors Rb and Ra of the windings w1 and w2 of the transformer Ue. The evaluating circuit includes a first operational amplifier V with two non-inverting inputs B and A applied to the mentioned winding terminals and an inverting input connected to the supply battery potential $-UB$. Further it comprises a second operational amplifier K which receives the output signal of amplifier V at a non-inverting input and a threshold voltage Uth at an inverting input. The voltage Uth is derived from the battery voltage $-UB$ via a voltage divider consisting of the resistors R1 and R2. The output signal of the operational amplifier K is an indicating signal XJ, which occurs upon ground key actuation.

A cutoff contact po, bridged by a high valued resistor Ri, is inserted, according to the invention, either into the a-wire (that is, the wire of the subscriber line at the supply potential) or the b-wire (that is, the wire at ground potential) or both (as shown). This cutoff circuit, comprising the cutoff contact po and resistor Ri, is connected between the respective potential source terminal of the a-and/or b-wire and its point of connection to the hybrid transformer which, as has been stated, is also the point of connection for one input of the evaluating circuit AS. In the case shown, the cutoff circuit lies between this point of connection and resistor Ra or Rb, respectively, but alternatively it may be inserted between the resistor Ra or Rb and the terminal of the potential source (−UB or ground). As mentioned, the cutoff circuit may be inserted alternatively in the a-wire or the b-wire, or in both wires (as shown) to provide a ground-symmetrical structure.

The resistance value of the resistor Ri bridging its respective cutoff contact is rated sufficiently high so that, with the associated cutoff contact po open, the residual current flowing through it due to the ground key actuation does not damage the switching elements lying in the respective portion of the supply circuit. On the other hand, the resistance value of the resistor Ri is made sufficiently low that the current flowing through it without ground key actuation due to a leakage current, in excess of the maximum permissible value, between the two wires of the subscriber line causes the evaluating circuit to respond in the same manner as in the case of a closed cutoff contact and simultaneous ground key actuation.

The mentioned wires a and b of the subscriber line lead to a telecommunications subscriber station T1n which has a ground key E, upon actuation of which the a-wire can be connected to ground potential.

The mode of operation of the circuit arrangement according to the invention will now be described more specifically, considering the mentioned alternative in which only one cutoff circuit comprising a cutoff contact and an associated resistor Ri lies in the a-wire.

Assuming the connecting contact po to be closed, a loop short occurs as subscriber T1n picks up, so that a loop current flows from ground, via Rb, winding w1 of transformer Ue, the b-wire, the subscriber station T1n, the a-wire, winding w2, the cutoff contact po and resistance Ra to the terminal of the supply battery having the potential −UB. At the input B of the evaluating circuit AS there is then present the potential −URb (the voltage drop across the resistor Rb with respect to ground), and at input A of the evaluating circuit there is present the potential −UB +URa, which is more positive in relation to the supply battery voltage by the voltage drop URa at resistor Ra. Therefore, under the further assumption mentioned above that the potential −UB is present at the inverting input, the amplifier V of the evaluating circuit delivers the voltage URa −URb. In this case, no output signal is delivered by the amplifier K of the evaluating circuit because of the respective rating of the threshold voltage Uth. If, now, the ground key E is actuated in the subscriber station thereby connecting the a-wire of the subscriber line directly to ground, the resistor Rb is practically short-circuited, and the supply current flows essentially through the portion of the supply circuit which includes the a-wire, winding w2, the cutoff contact po and the resistor Ra.

Accordingly, amplifier V of the evaluating circuit will deliver the voltage URa and, because of the now existing difference of the input values of amplifier K, the evaluating circuit AS will produce an output signal XJ indicating the existence of a ground key actuation. After a prescribed delay, the control unit of the exchange to which the subscriber line access circuit belongs switches off the power supply by causing the cutoff contact po to open. This is done, in a manner well known in the art, by controlling the voltage to the relay associated with the contact po. Resistor Ri in parallel with the cutoff contact has so high a resistance that the residual current then still flowing with the cutoff contact open does not damage the supply circuit, even if the ground key actuation persists for a prolonged time. After termination of the ground key actuation, the output signal XJ of the evaluating circuit AS disappears, whereupon the cutoff contact po immediately closes again and the initially explained current conditions reappear.

For insulation testing, the cutoff contact po is also opened. As mentioned above, the resistor Ri in parallel with the cutoff contact is rated so that, when exceeding the highest permissible leakage current (which is determined by the leakage resistance RL between the a-wire and ground), as in the case of ground key actuation an asymmetry is caused at the inputs A and B of the evaluating circuit AS, leading to the delivery of the signal XJ, whereby in this case the existence of an insulation fault is indicated. If this insulation fault is temporary, the signal XJ will disappear again, this being reported to the control unit of the exchange just as in the case of termination of the ground key actuation.

There has thus been shown and described a novel telecommunications subscriber line access circuit which fulfills all the objects and advantages sought therefore. Many changes, modifications, variations and other uses and applications of the subject invention will, however, become apparent to those skilled in the art after considering this specification and the accompanying drawing which discloses the preferred embodiment thereof. For example, whereas mechanical relay contacts are shown and described, electronic switches may be substituted in a manner known in the art. All such changes, modifications, variations and other uses and applications which do not depart from the spirit and scope of the invention are deemed to be covered by the invention which is limited only by the claims which follow.

I claim:

1. A telecommunications subscriber line access circuit for coupling a two wire subscriber station to a four wire interface to a system, said circuit comprising:
  (a) a two-to-four wire hybrid transformer;
  (b) a power supply bridge connected to the two wire side of said transformer for providing a potential difference across the two wires of said subscriber station, said power supply bridge including:
    (1) a first resistor connected between ground and a first winding of said transformer on the two wire side;
    (2) a second resistor connected between a source of potential and the second winding of said transformer on the two wire side; and
    (3) a capacitor connected between said first and second resistors on the sides thereof which are connected to said first and second windings;
  (c) an evaluating circuit connected to said first and second winding for producing an indicating signal upon ground key actuation of said subscriber; and
  (d) a cutoff circuit arranged in the power supply bridge, in series with at least one of said first resistor and said second resistor, said cutoff circuit including:
    (1) a cutoff switch which is opened, with a delay, upon ground key actuation and closed upon termination of ground key actuation; and
    (2) a third resistor bridging said cutoff switch and having a sufficiently high resistance value that, with the cutoff switch open, the residual current flowing through it due to ground key actuation does not damage the circuit components lying in the affected portion of the access circuit and having a sufficiently low resistance value that the current flowing through it, without ground key actuation and due to a leakage current between the wires of the subscriber line in excess of the permitted limit value, causes the evaluating circuit to respond in the same manner as with a closed cutoff switch and simultaneous ground key actuation.

2. The circuit defined in claim 1, wherein said cutoff circuit is arranged in series with said second resistor only.

3. The circuit defined in claim 1, wherein a separate cutoff circuit is arranged in series with both said first and said second resistor.

* * * * *